E. H. HODGES.
NON-SKID CHAIN.
APPLICATION FILED DEC. 6, 1918.
1,338,626.
Patented Apr. 27, 1920.
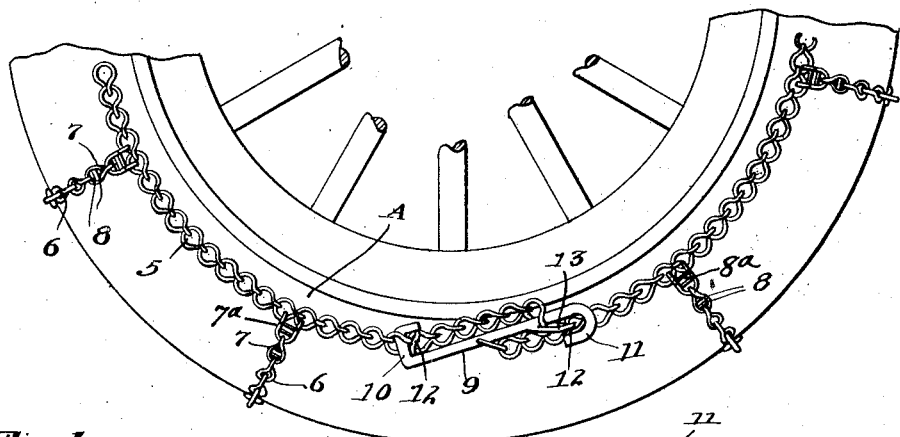
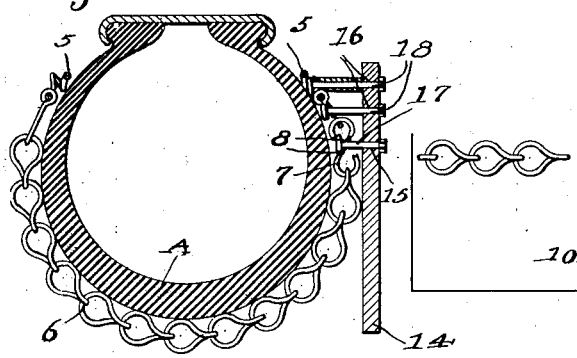
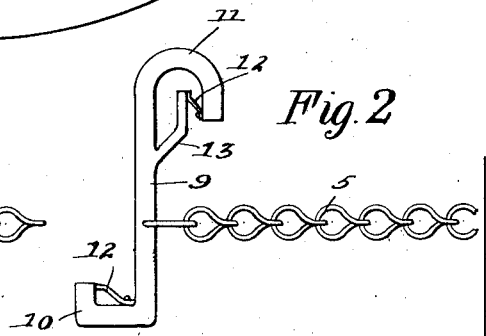
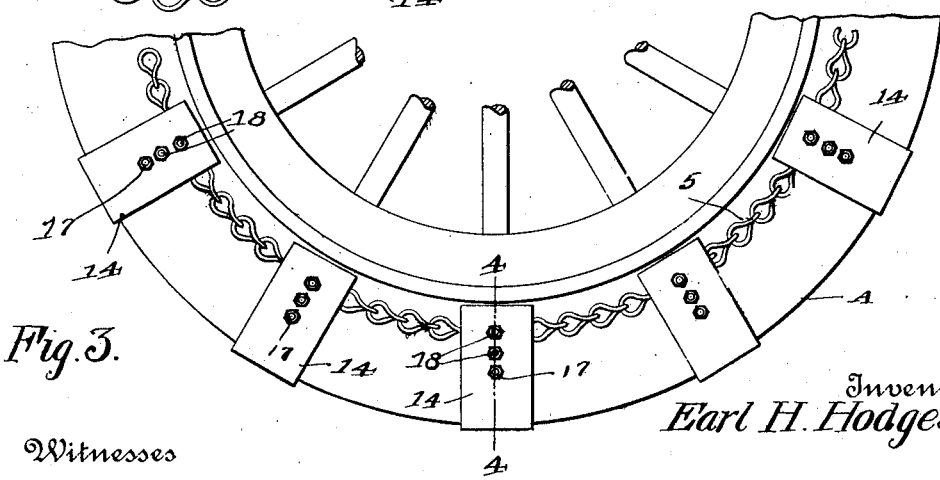
Inventor
Earl H. Hodges
Witnesses
H. A. Thomas
By Victor J. Evans
Attorney

UNITED STATES PATENT OFFICE.

EARL H. HODGES, OF KILLAM, ALBERTA, CANADA.

NON-SKID CHAIN.

1,338,626.  Specification of Letters Patent.  Patented Apr. 27, 1920.

Application filed December 6, 1918. Serial No. 265,664.

*To all whom it may concern:*

Be it known that I, EARL H. HODGES, a citizen of the United States, residing at Killam, in the Province of Alberta and Dominion of Canada, have invented new and useful Improvements in Non-Skid Chains, of which the following is a specification.

This invention relates to non-skid devices, particularly to chains engageable upon vehicle tires for preventing skidding thereof, and has for its object the provision of a skid chain provided upon its ends with peculiarly constructed lever members provided upon their end portions with hooks engageable with the links of the chain whereby the chain may be conveniently tightened about the tire.

An important object is the provision of a chain of this character, certain of the links of which are so constructed as to have engaged thereupon a plurality of steel plates engaging the roadway during rotation of the tire, whereby side slipping will be effectively prevented.

An additional object is the provision of a chain of this character which will be simple and inexpensive in manufacture, which may be very quickly and easily applied to and tightened upon a tire, which will be efficient in service, durable in use, and a general improvement in the art.

With the above and other objects and advantages in view, the invention consists in the details of construction to be hereinafter more fully described and claimed, and illustrated in the accompanying drawings, in which Figure 1 is a side elevation of a wheel and tire equipped with my chain, Fig. 2 is an enlarged view showing only the meeting ends of the chain with the tightening levers in disengaged position, Fig. 3 is a side elevation of a wheel and tire equipped with my chain and showing the side-slip preventing plates thereon, and Fig. 4 is a cross sectional view on the line 4—4 of Fig. 3.

Referring more particularly to the drawings, the numeral 5 designates the side chains which are formed of links of any desired length, these links each being partially twisted in order that all the links will lie flat against the tire. Disposed at suitably spaced intervals are cross chains 6 formed of links of any suitable length, which are likewise twisted. The next to the endmost links 7 of the cross chains 6 are provided with transverse bars 8 and the endmost links 7ᵃ are provided with transverse bars 8ᵃ for a purpose to be described.

The chain is applied to a tire A by engaging it circumferentially thereon in the usual manner. In order that the chain may be tightened and held securely upon the tire, I provide upon one end of each of the side chains 5, a lever member 9 which is pivotally connected with one endmost link of the side chain 5 at a point spaced from the center of the lever, whereby one end of the lever will be longer than the other. The ends of each lever 9 are bent to provide hooks 10 and 11, each of which has secured thereon a leaf spring 12. The spring on the hook 11 engages a fixed shoulder member 13. When the chain is engaged upon a tire the hooks 11 are engaged within the endmost links at the other ends of the side chains 5, after which the operator grasps the levers 9 and pulls them over so as to apply tension upon the chains for drawing the ends together. After these levers are swung over the hooks 10 are engaged within other links spaced from the end links within which the hooks 11 are engaged. When this is done the links engaged upon the hooks 11 will engage against the fixed or rigid shoulder members 13. The provision of the leaf springs 12 prevents any possibility of either of the hooks 10 or 11 becoming disengaged from the links into which they are inserted.

In order to provide means for preventing any side slipping, I employ a plurality of elongated rectangular plates 14 formed preferably of hardened steel, each of which is provided with holes 15 and 16, there being one hole 15 and two holes 16.

When it is desired to make use of the plates 14, they are disposed upon one of the side chains 5 and are secured in position by means of bolts 17 which pass through the single holes 15 and between the cross bars 8 of the links 7 of the cross chains 6. The plates 14 are further secured by other bolts 18, one of which passes through one of the holes 16 and between the cross bars 8ᵃ of the link 7ᵃ, and the other of which passes through the other hole 16 and engages between the bars 8ᵃ and the adjacent sides of the links of the chain 5 at the point of engagement of two adjacent links of the chain 5 with each other, It is of course necessary that the bolts be engaged with the chain before the plate 14 is placed in position as the heads of the bolts are disposed toward the tire. With the threaded ends of the bolts projecting outwardly away from the tire and chain it is a simple matter to place the plate 14 in position and screw on the nuts holding the plates on the bolts. The plates 14 which may be provided on either side of the tire will thus extend radially therefrom and will lie in the same plane. The outer ends of these radially extending plates will engage upon the roadway and will effectively prevent any side slipping of the vehicle equipped with my chains.

From the foregoing description and a study of the drawing it will be apparent that I have thus provided a very simple and efficient skid chain which may be quickly and easily applied and which is provided with means whereby considerable tension may be placed upon a chain for drawing the ends thereof together and for holding said ends in secured relation.

While I have shown and described the preferred embodiment of the invention, it will of course be readily understood that I reserve the right to make such changes in the form, construction, and arrangement of parts as will not depart from the spirit of the invention nor the scope of the subjoined claim.

Having thus described my invention, I claim—

A device of the character described comprising a pair of side chains adapted to be disposed upon the sides of a tire in circumferential relation thereto, cross chains connecting said side chains at spaced intervals, each cross chain including at each end a pair of links each having a pair of transverse bars, means for securing the ends of said side chains together, and a plurality of plates associated with one side chain, each plate being provided with a plurality of holes, a bolt passing through one of said holes and between the transverse bars in the link next adjacent the endmost link of the cross chain, and other bolts passing through the remaining holes and engaging the transverse bars in the endmost link of the cross chain.

In testimony whereof I affix my signature.

EARL H. HODGES.